(12) United States Patent
Mueller et al.

(10) Patent No.: US 10,687,230 B2
(45) Date of Patent: *Jun. 16, 2020

(54) ADJUSTING CELL SITE PARAMETERS USING A MAPPING TOOL

(71) Applicant: T-Mobile USA, Inc., Bellevue, WA (US)

(72) Inventors: Justin Mueller, Sammamish, WA (US); Shilpa Bhanot, Sammamish, WA (US); Robert Berrier, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,787

(22) Filed: Aug. 22, 2019

(65) Prior Publication Data

US 2019/0380050 A1 Dec. 12, 2019

Related U.S. Application Data

(63) Continuation of application No. 15/632,210, filed on Jun. 23, 2017, now Pat. No. 10,484,889, which is a continuation of application No. 14/967,044, filed on Dec. 11, 2015, now Pat. No. 9,699,671.

(51) Int. Cl.
| | | |
|---|---|---|
| *H04W 24/02* | (2009.01) | |
| *H04W 64/00* | (2009.01) | |
| *H04W 16/18* | (2009.01) | |
| *H04W 88/08* | (2009.01) | |

(52) U.S. Cl.
CPC .......... *H04W 24/02* (2013.01); *H04W 16/18* (2013.01); *H04W 64/003* (2013.01); *H04W 88/08* (2013.01)

(58) Field of Classification Search
CPC ... H04W 24/02; H04W 64/003; H04W 16/18; H04W 88/08
USPC .................................. 455/414.1, 446, 456.5
See application file for complete search history.

(56) References Cited

U.S. PATENT DOCUMENTS

| | | | |
|---|---|---|---|
| 6,125,329 A * | 9/2000 | Place ..................... | G09B 27/04 702/5 |
| 9,699,671 B1 | 7/2017 | Mueller et al. | |
| 2006/0217122 A1* | 9/2006 | Levit ..................... | H04W 16/18 455/446 |
| 2008/0102803 A1* | 5/2008 | Chow ................... | H04W 16/20 455/414.2 |
| 2013/0159862 A1 | 6/2013 | Carr et al. | |
| 2014/0051451 A1* | 2/2014 | Goldberg .............. | H04W 16/18 455/446 |
| 2014/0114635 A1 | 4/2014 | Sato et al. | |

(Continued)

Primary Examiner — Michael Y Mapa
(74) Attorney, Agent, or Firm — Perkins Coie LLP

(57) ABSTRACT

Systems and methods for adjusting cell site parameters are described. The systems and methods cause a map of a geographical area to be displayed, access known or stored location coordinates for antennas at a cell site that is located within the of the geographical area, and present display elements representing the antennas at first positions within the displayed map that correspond to the known location coordinates for the antennas at the cell site. In response to input received from a user, the systems and methods adjust the known location coordinates for the antennas at the cell sites to new location coordinates associated with second positions of the display elements within the displayed map. Further details are described herein.

20 Claims, 11 Drawing Sheets

(56) References Cited

U.S. PATENT DOCUMENTS

2016/0037356 A1 2/2016 Bathula et al.
2017/0295505 A1 10/2017 Mueller et al.

* cited by examiner

ADJUSTING CELL SITE PARAMETERS USING A MAPPING TOOL

CROSS-REFERENCE TO RELATED APPLICATIONS

This application is a continuation of U.S. patent application Ser. No. 15/632,210, filed on Jun. 23, 2017, and entitled "ADJUSTING CELL SITE PARAMETERS USING A MAPPING TOOL;" which is a continuation of U.S. patent application Ser. No. 14/967,044, filed on Dec. 11, 2015, now U.S. Pat. No. 9,699,671, and entitled "ADJUSTING CELL SITE PARAMETERS USING A MAPPING TOOL;" the disclosures of which are hereby incorporated herein in their entireties by reference.

BACKGROUND

Mobile electronic devices (such as smart phones, personal digital assistants, computer tablets, and so on) are ubiquitous. Mobile devices provide advanced computing capabilities and services to users, such as voice communications, text and other messaging communications, video and other multimedia communications, streaming services, and so on. Often, users, via their mobile devices, access such services as customers or subscribers of telecommunications carriers, which provide telecommunications networks within which the users make voice calls, send text messages, send and receive data, and so on.

A telecommunications network is established via a complex arrangement and configuration of many cell sites that are deployed across a geographical area. For example, there may be a large group of cell sites, each having multiple antennas pointing in different directions, set up across a specific geographical location (e.g., a city, neighborhood, and so on), in order to provide adequate, reliable coverage for mobile devices (e.g., smart phones, tablets, and so on) seeking access to the telecommunications network (and the services provided by the network).

Given such complexities, problems may arise within the telecommunications network when cell sites and other devices are incorrectly configured and/or deployed, among other things. These problems may lead to dropped calls, missed messages, low or congested communication bandwidths, and so on, within the network. Should the problems persist, customers and potential customers may seek other networks (provided by different carriers) that do not have such associated problems.

BRIEF DESCRIPTION OF THE DRAWINGS

Embodiments of the present technology will be described and explained through the use of the accompanying drawings.

Figure 1:
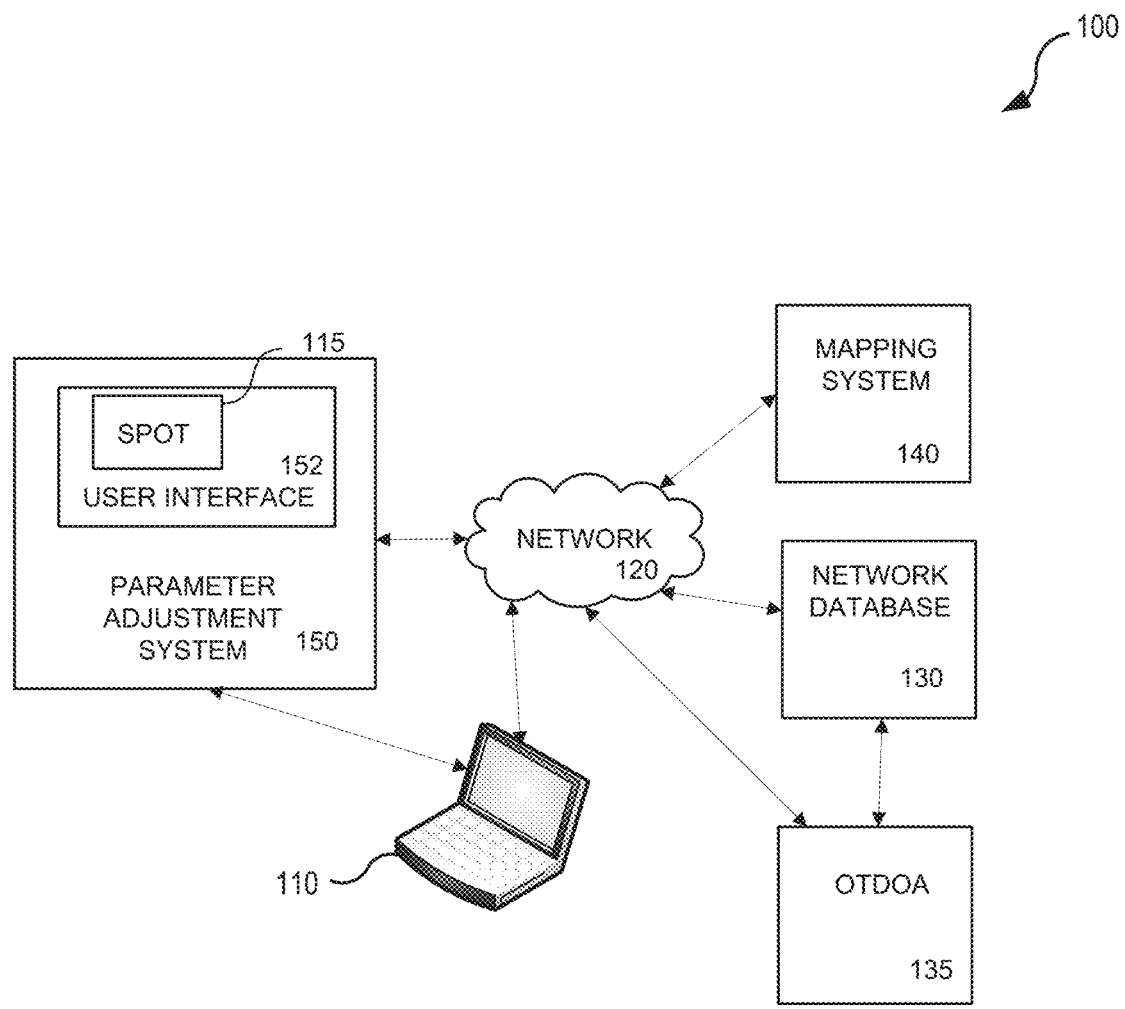
FIG. 1 is a block diagram illustrating a suitable computing environment within which to perform cell site parameter optimization.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for adjusting, correcting, or otherwise optimizing cell site parameters, such as location information (latitude and longitude ("Lat Long coordinates") for antennas at cell sites. In some cases, location information and other parameters stored within network databases for various network components (e.g., cell sites and associated antennas) is often incorrect or generalized to a physical structure (e.g., building, tower, wall, and so on) at which the cell sites resides. Such misinformation and other discrepancies causes problems for processes running within the various networks, such as OTDOA (Observed Time Differences of Arrival) processes within LTE (Long-term Evolution) networks that rely on accurate location information associated with cell sites to accurately locate mobile devices and their associated users.

Therefore, a telecommunications network would benefit from tools that identify actual locations of network devices and correct the stored parameters for the network devices, in order to provide OTDOA and other network-based processes with accurate, reliable information. Additionally, accurate locations of network devices may enable telecommunications networks to provide accurate, or more accurate, coverage maps, such as maps that simulate the wireless coverage/access for a certain area or region. Further, telecommunication networks may utilize location information during Automatic Cell Planning processes, which utilize automated tools to optimize antenna parameters (e.g., azimuth, electrical tilt, mechanical tilt, antenna position, and so on), to maximize cellular coverage and minimize interference between antenna.

The system and methods may provide and/or utilize a parameter optimization tool. The optimization tool may cause a map of a selected portion of a geographical area to be displayed by a user interface provided by the optimization tool, access known or stored location coordinates for antennas at a cell site that is located with the selected portion of the geographical area (and is part of a telecommunications network providing communication services to mobile devices), and present display elements representing the antennas at first positions within the displayed map that correspond to the known location coordinates for the antennas at the cell site.

In response to input received from a user moving the presented display elements to new positions within the displayed map (which correspond to images of the antennas within the displayed map), the optimization tool adjusts the known location coordinates for the antennas at the cell sites to new location coordinates associated with the new positions within the displayed map.

Therefore, in some embodiments, the system and methods provide tools that identify and correct discrepancies in cell site and other network device parameters for devices deployed with a telecommunications network, among other benefits. For example, a wireless service provider may have a database that provides geographic location coordinates associated with each cell site antenna. Using the tool described herein, a user can see that the geographic coordinates associated with an antenna is associated with one side of a building, but a satellite image of the building shows the antennas and that they are actually on the opposite side of that building. The user, using a GUI of the tool, can then select a point on the correct, opposite side of the building, where by that point is now associated with new geographic coordinates that correctly identify the location of the antennas.

In the following description, for the purposes of explanation, numerous specific details are set forth in order to provide a thorough understanding of embodiments of the present technology. It will be apparent, however, that embodiments of the present technology may be practiced without some of these specific details.

Examples of Suitable Computing Environments

As described herein, in some embodiments, the systems and methods provide tools for optimizing parameters of cell sites within a telecommunications network. FIG. 1 is a block diagram illustrating a suitable computing environment 100 within which to implement the tools that perform cell site parameter optimization.

A user (e.g., an engineer or other network professional) uses his/her computing device 110 (such as a mobile or smart phone, tablet computer, mobile media device, desktop computer, and so on), to access a parameter optimization tool (e.g., a Site Parameter Optimization Tool) 115. The computing device 110 may access the tool 115, which may be a program or application, directly, or via a network 120, such as a network 120 provided by a telecommunications (wireless) carrier. The tool 115 may be associated with or provided by a parameter adjustment system 150, which provides the parameter optimization tool 115 to the computing device 110 via a user interface 152 or other user interaction component.

The parameter adjustment system 150 may access and/or transmit information (e.g., corrected parameters for cell sites) to a network database 130, which may be a database that stores parameter information (e.g., cell site location information, azimuth information, use information, configuration information, and so on) associated with various network devices (e.g., cell sites and associated antennas) deployed within the network 120, or another telecommunications network.

Various services, such as OTDOA and other positioning or location determination services provided by an OTDOA system 135, that are running within the network 120 and/or associated with the network 120, may access and utilize the information within the network database 130. In some cases, the parameter adjustment system 150 may directly access and/or transmit information between the OTDOA system 135.

The parameter adjustment system 150 may also communicate with a mapping system 140 in order to access mapping information and associated information (e.g., images of geographic locations and/or coordinate information for positions within displayed maps) for maps displayed by the parameter adjustment system 150. For example, the parameter adjustment system 150 may access a map web service (e.g., the Google Maps Web Services), via a collection of HTTP interfaces associated with providing map applications and geographic data for map applications. Of course, the parameter adjustment system 150 may access other map services, or locally contain a map service or application, in order to access and receive various map information.

FIG. 1 and the discussion herein provide a brief, general description of a suitable computing environment 100 in which the system can be supported and implemented. Although not required, aspects of the customer incentive system 150 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the computing device 110 may include network communication components that enable the mobile device to communicate with remote servers or other portable electronic devices by transmitting and receiving wireless signals using a licensed, semi-licensed, or unlicensed spectrum over communications network, such as network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Further details regarding the operation and implementation of the parameter adjustment system 150 will now be described.

Examples of Adjusting Cell Site Parameters

Figure 2:
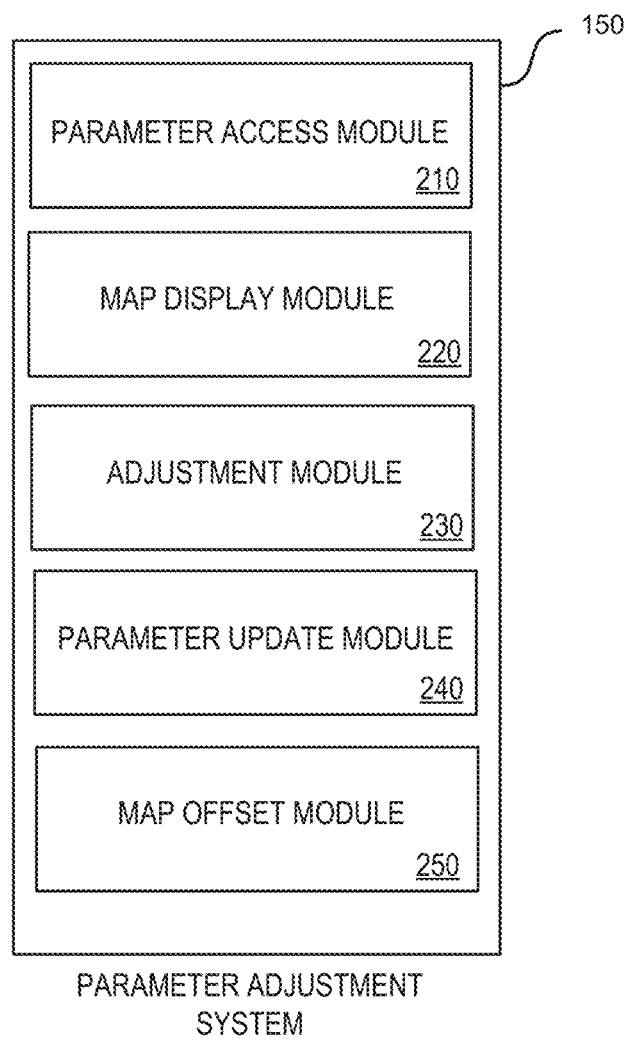
FIG. 2 is a block diagram illustrating components of a parameter adjustment system.

FIG. 2 is a block diagram illustrating components of the parameter adjustment system 150. The parameter adjustment system 150 may include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein. For example, the parameter adjustment system 150 may include a parameter access module 210, a map display module 220, an adjustment module 230, a parameter update module 240, and a map offset module 250.

In some embodiments, the parameter access module 210 is configured and/or programmed to access parameters for a cell site deployed within a selected geographical area of a telecommunications network, such as network 120. The accessed parameters may include parameters associated with one or more antennas located at the cell site, such as latitude and longitude coordinates, azimuth information, height information, configuration information, and so on, for the antennas at the cell site.

In some embodiments, the map display module 220 is configured and/or programmed to access a map of the selected geographical area of the telecommunications network. For example, the map display module 220 may access map information from a remotely or externally located mapping system, such as mapping system 140, via an application programming interface (API) provided by the mapping system 140.

The map display module 220 is also configured and/or programmed to identify a specific location within the accessed map that corresponds to current location information for the cell site as stored by the parameters for the cell site. For example, the map may include or be associated with location information (Lat long coordinates) that correlate to the many points shown in the map.

The map display module 220 may cause a display of the map of the selected geographical area of the telecommunications network, and/or cause one or more display elements that represent the one or more antennas located at the cell site to be placed within the map at positions within the map that correspond to current locations for the one or more antennas located at the cell site. The display elements may be movable to other positions within the map.

In some embodiments, the adjustment module 230 is configured and/or programmed to access or receive input associated with moving the one or more display elements to various positions within the map. For example, a user may perform drag and drop operations that cause the display elements to move from the positions within the map that correspond to the current locations for the one or more antennas located at the cell site to second, different, positions within the map that correspond to images of the one or more antennas shown within the map.

In response to such operations (e.g., movement of display elements from first or initial positions to second or new positions), the adjustment module 230 adjusts the parameters for the cell site to parameters that are based on and associated with the second, new/different, positions within the map that correspond to the images of the one or more antennas within the map. For example, the adjustment module 230 may retrieve location information associated with the second or new positions within the map, and adjust the parameters using the location information.

As another example, the adjustment module 230 may enable a user to draw lines that model the building orientation (such as the direction at which walls face), or other physical site limitations via which antenna constraints can be derived (e.g., such as how much an antenna azimuth can be adjusted without projecting RF energy into the walls of the building). Such information may be located in a national database and be used in Automatic Cell Planning tools, where constraints associated with antenna azimuth changes (or, possible changes) would be utilized.

In some embodiments, the parameter update module 240 is configured and/or programmed to transmit, send, and/or communicate the adjusted parameters for the cell site to a telecommunications network database, such as database 130, that stores parameters for network devices deployed within the telecommunications network 120.

Because the parameter optimization tool 115 utilizes, in some cases, map information from various third party or other web based services, such as mapping system 140, the parameter adjustment system 150 may include the map offset module 250, which is configured and/or programmed to discern the point of view of a displayed map and/or offset information for images within a displayed map.

For example, the map offset module 250 may access input associated with a graphical element drawn on the map (via user interface 152) by a user between two points of an image of a structure displayed by the map, and identify a parallax error for the map based on the accessed input. The adjustment module 230 may then modify the adjusted parameters for a cell site to compensate for the parallax error identified by the map offset module 250.

For example, the map may show antennas on tops of buildings that appear to be at a 20 degree angle with respect to a viewer. The adjustment module 230, using such information, compensates for the error introduced by the parallax in the map, modifying the parameters that were adjusted via the map to be based on actual locations of the antennas, and not locations of the antennas within a skewed angle map.

In some cases, the map offset module 250 may automatically identify or estimate parallax errors for a displayed map. For example, the map offset module 250 may access or receive metadata associated with a map that identifies a parallax error or view angle for the map. As another example, the map offset module 250 may analyze images (or other features within the displayed map) to identify a parallax error for the map, by analyzing features (e.g., identifying and determining angles of walls or other structures) depicted within the displayed map.

Thus, the parameter adjustment system 150 utilizes map-based information, such as a map having an image view of a selected geographical area, along with location information (e.g., Lat Long coordinates) correlated to positions within the image view of the selected geographical area, when determining what adjustments to make to stored, known, or previously measured parameters for cell sites of a telecommunications network.

Figure 3A:
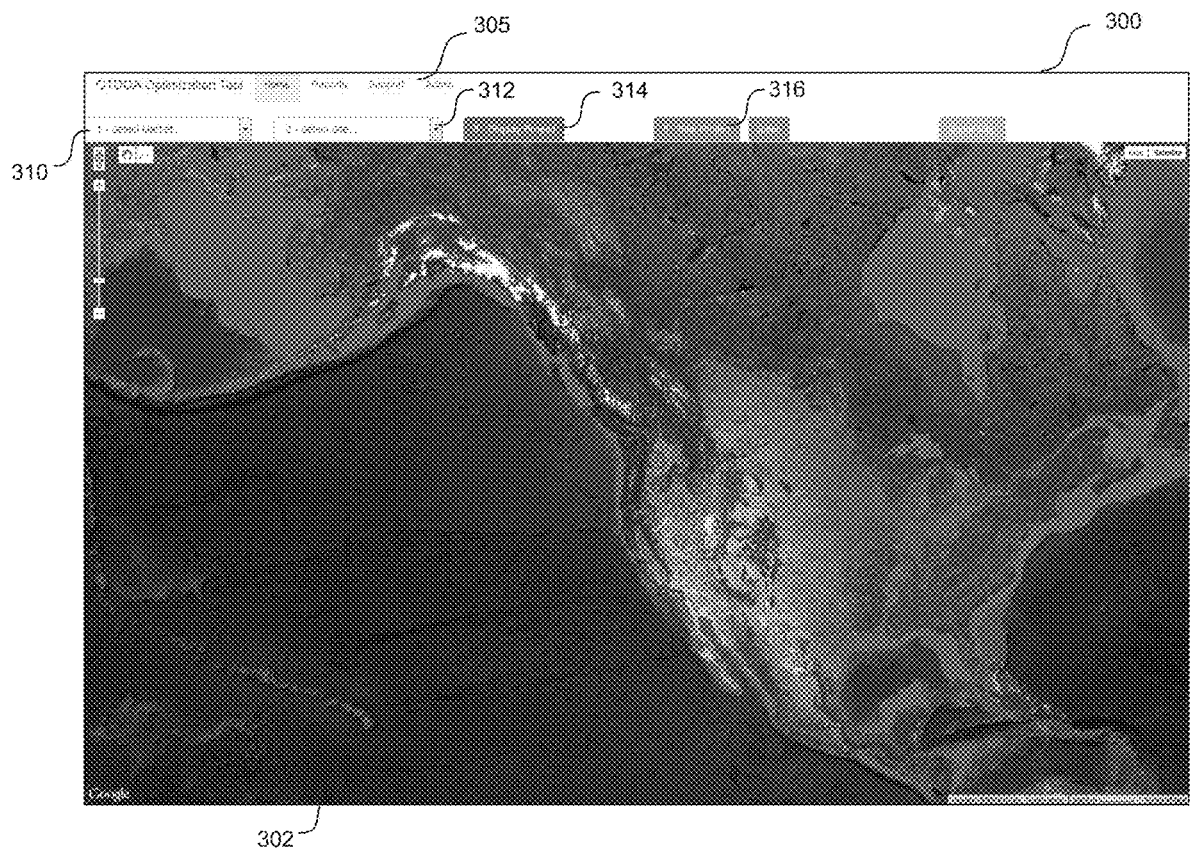
FIGS. 3A to 3B are display diagrams illustrating example user interfaces presented by a parameter adjustment tool.
Figure 3B:

As an example, FIGS. 3A to 3B present user interfaces generated by the parameter adjustment tool 115, including the display of map information. To begin, FIG. 3A depicts an example user interface 300 rendered and displayed by the parameter adjustment tool 115. The user interface 300 includes a displayed map 302 of a geographical area, and various user-selectable navigation components, such as a navigation menu 305, a location selection component 310 that facilitates selection and display of a geographical area or market (e.g., an area or market having multiple cell sites), and a cell site selection component 312 that facilitates the display of a map (e.g., image) of a selected cell site within a selected area or market.

The user interface 300 also includes various user-selectable tabs, such as a "display project" tab 314 that, when selected, causes the tool 115 to display a current or previously worked on cell site parameter optimization project, and a "new project" tab 316 that, when selected, causes the tool 115 to display a new or initial cell site parameter optimization project. Of course, the user interface 300, via the parameter adjustment tool 115, may display other user-selectable elements, navigation menus, and so on.

FIG. 3B depicts the user interface 300 after completion of a cell site parameter optimization project (e.g., after selection of the display project tab 314). The user interface displays a map 320 of images of a selected cell site (e.g., "SEO1001T," via component 312) within a selected geographical area (e.g., "Seattle Wash.," via component 310). The map displays an image 322 of the cell site, along with display elements 325 that have been placed at locations within the map 320 at which antennas are depicted in the image 322 of the cell site. The map also includes a display element 324 associated with a map offset performed for the map 320, where an offset includes a measurement of parallax error introduced by the viewing angle of images within the map).

The user interface 300 also presents cell site parameter information 315, such as information representing adjusted location information for the antennas at the cell site. For example, the presented parameter information 315, for one of the antennas "SEO1001T_11LAA," includes:

Previous stored location information—"(−122.548188, 47.772366)";
Azimuth information—"100";
Antenna height information—"13.72" meters;
Antenna class—"roof top mount";
Adjusted location information—"(−122.187788, 47.772468)"; and
An adjustment delta—"58.11" meters.

Thus, in response to a user moving the display elements 325 to locations 322 within the map 320 that depicts the antennas of the cell site, the tool parameter adjustment tool 115 adjusts the location information for the antennas, displaying the adjusted information, along with other information, as the parameter information 315 presented within the user interface 300. The parameters adjustment system 150 may then send or transmit the information 315 to various services, databases, or other entities that utilize location information during running or performed processes.

FIGS. 4A to 4D illustrate the implementation and interactions between a user and the parameter adjustment tool 115 when the tool 115 is used to adjust cell site parameters during a new cell site parameter optimization project.

Figure 4A:
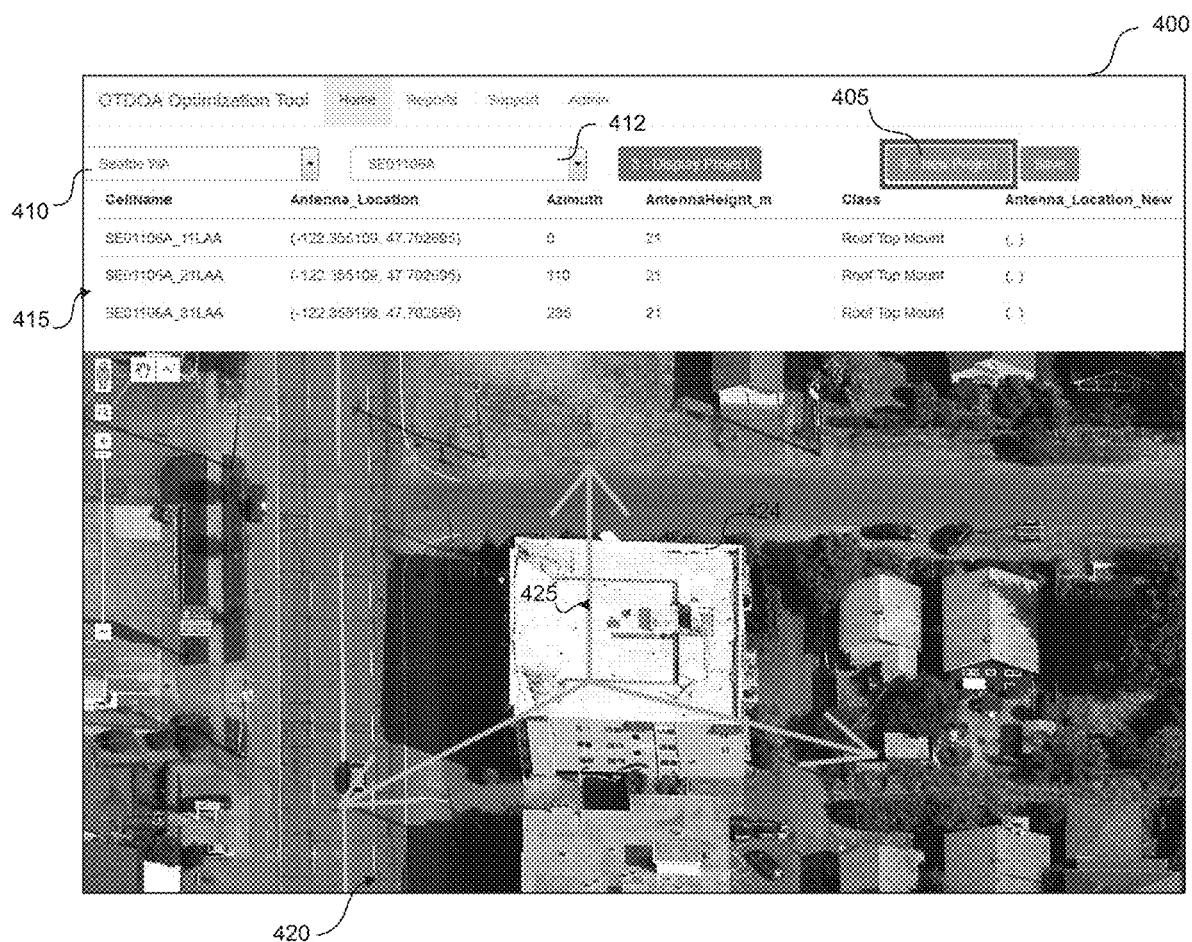
FIGS. 4A to 4D are display diagrams illustrating example interactions between a user and a parameter adjustment tool.

Upon selection of a new project tab 405, FIG. 4A depicts an example user interface 400 rendered and displayed by the parameter adjustment tool 115. The user interface 400 displays a selected geographical area (e.g., "Seattle Wash.") via component 410, and a selected cell site (e.g., "SE011060A") via component 412.

The user interface 400 displays a map 420 of images of the selected cell site within the selected geographical location. The map 420 displays an image 424 of the cell site, and a display element 425 overlaid onto the image of the cell site at a position (e.g., a first or initial position) associated with known or stored parameters for the cell site (e.g., stored Lat Long coordinates for the antennas at the cell site). The user interface also presents parameter information 415 for the antennas at the cell site, including the known or stored location information for the antennas at the cell site.

As depicted in the Figures, the display element 425 may be shaped in a variety of ways that indicate antenna configurations, including arrows, lines, or other shapes or geometries, which represent the antennas and their azimuths. Of course, other display elements are possible.

Figure 4B:

FIG. 4B depicts the user interface 400 after the display elements 425 have been moved to second, different locations within the map 420. For example, a user (e.g., a cell site engineer having knowledge of the physical location depicted in the image 424) may identify locations 435A, 435B, 435C within the image at where the antennas are located. The user may recognize the antennas within the image, or utilize other features of the image (shadows, other structures or devices, knowledge of the cell site layout) when identifying the locations 435A, 435B, 435C.

The user, via drag and drop operations, selects the display elements 425, shown as arrows 430A, 430B, 430C, and move the arrows to locations 435A, 435B, 435C within the map 420 that display the antennas of the selected cell site. In some cases, movement of the arrows 430A, 430B, 430C may cause their appearance to change color, shape, and so on, which may indicate they have been placed at their new locations.

Figure 4C:
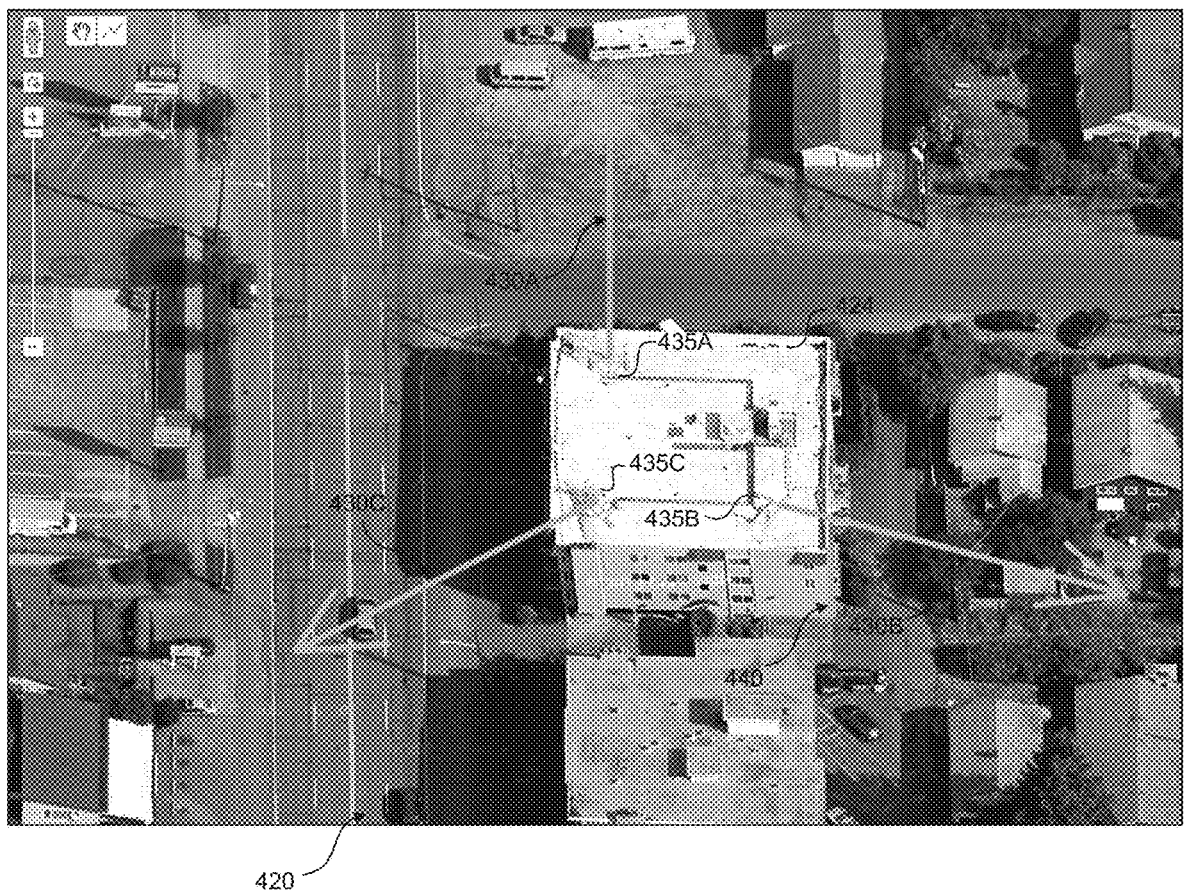

Once the user has placed the arrows 430A, 430B, 430C at their respective locations 435A, 435B, 435C within the map 420, the user, as depicted in FIG. 4C, may provide input to identify a map offset associated with a view angle of the images of the displayed map 420, in order to determine a parallax error to attribute to the displayed map 420. For example, the user may provide input associated with placing or drawing a line 440 or other similar display element that connects a top of a structure depicted in the map 420 to a bottom or base of the structure.

This offset line 440 may compensate for building slant (e.g., parallax error) depicted in the images of the map 420, because the start of the offset line 440 and the end of the offset line 440 have the same GPS coordinates for the actual geographical location depicted in the map 420. In some cases, when the view of the map 420 is directly overhead, the offset line would not be used.

In some cases, the user may provide other input by drawing display elements onto the map 420. For example, the user may identify a wall or other structure at which an antenna is mounted. This information may then be associated with the antennas, as it provides physical, geometrical constraint information, which can be used by systems that plan antenna rotations or other re-configurations of the antennas within the network.

Figure 4D:

Once the arrows have been moved to the locations that depict the antennas within the map 420 and any offset line 440 has been added, the user selects the display project tab 450, as depicted in FIG. 4D, and the parameter optimization tool 115 updates the user interface 400 to display the adjusted parameter information 455 for the cell site. For example, the tool 115 adjusts the known parameter information for the cell site "SE011060A," which is a single latitude and longitude coordinate for each of the multiple antennas located at the cell site, to multiple new, different, latitude and longitude coordinates for each of the antennas located at the cell site.

Figure 5A:
FIGS. 5A to 5B are display diagrams illustrating example user interfaces for comparing information between views of displayed maps.
Figure 5B:

As described herein, the user interfaces provided by the parameter optimization tool 115 may display maps at various different view angles, which may cause inaccuracies when determining the adjusted parameters for cell sites. FIGS. 5A to 5B are display diagrams illustrating example user interfaces for comparing information between views of displayed maps.

For example, FIG. 5A displays a satellite 45 degree view map 500 of a cell site within a geographical location, and FIG. 5B displays a satellite normal view map 510 of the cell site within the geographical location. In order to compare possible differences between the maps, a user draws a line 505 on a specific structure (e.g., proximate to a displayed antenna) within the map 500.

The user then navigates the user interface to the normal view map 510. Within the normal view map 510, the line 515 is overlaid onto a slightly different position of the structure within the map 500. Using a scale provided by the user interface, the difference between the positions of the lines 505 and 515 is determined (e.g., 2 meters). For example, the differences in positions in the offset line between views may inform a user if the 45 degree view should or should not be used to complete a site study. In some cases, if there is a big distance between satellite and 45 degree views, the satellite view may be used. Once a view is chosen, the user may continue the site study in that view, including dragging and dropping antennas, drawing offset line, saving the project, and so on.

Figure 6:
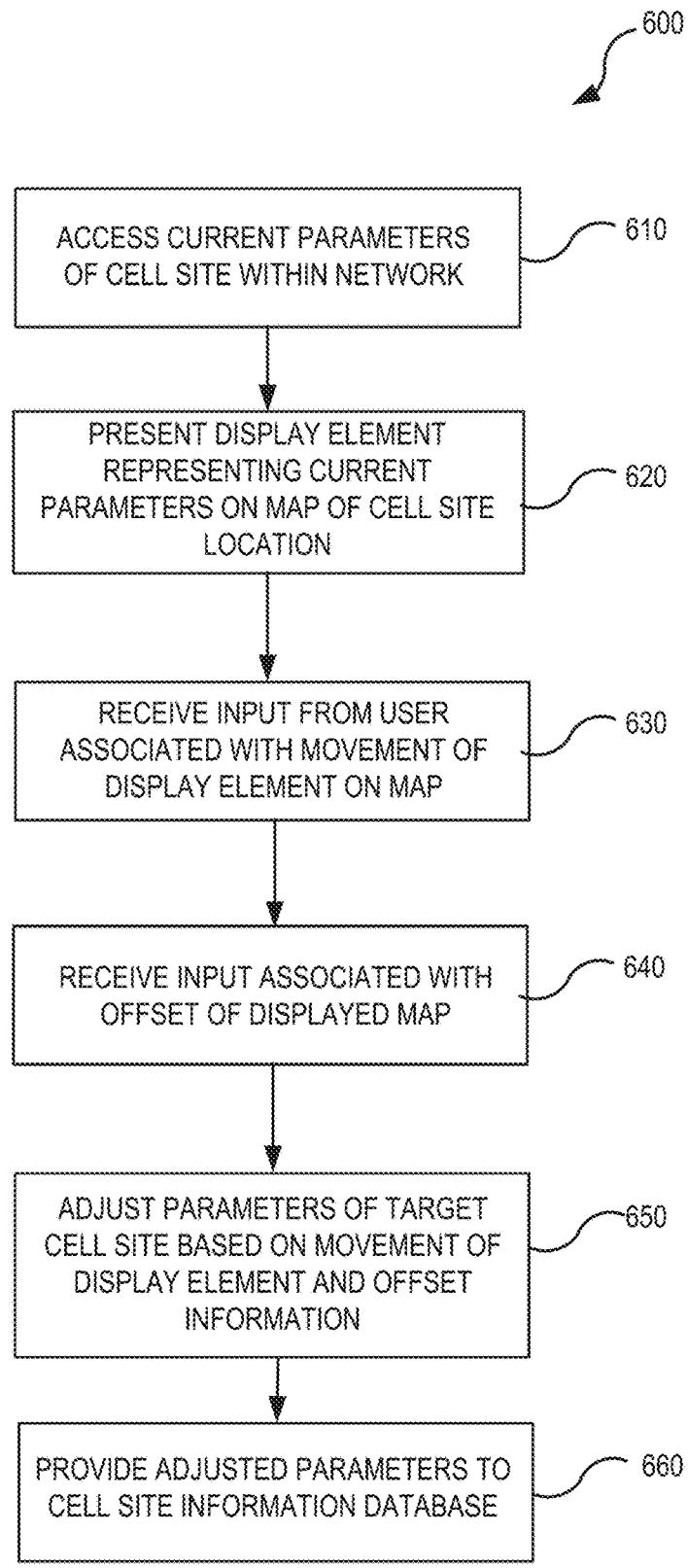
FIG. 6 is a flow diagram illustrating a method for adjusting the parameters of a cell site within a telecommunications network.

As described herein, in some embodiments, the parameter adjustment system 150 performs various algorithmic processes or methods in order to determine and adjust parameters for cell sites within geographical locations. FIG. 6 is a flow diagram illustrating a method 600 for adjusting the parameters of a cell site within a telecommunications network. The method 600 may be performed by the parameter adjustment system 150 and, accordingly, is described herein merely by way of reference thereto. It will be appreciated that the method 600 may be performed on any suitable hardware.

In operation 610, the parameter adjustment system 150 accesses known location coordinates for antennas at a cell site that is located with a selected portion of a geographical area and part of a telecommunications network providing communication services to mobile devices. The accessed coordinates or parameters may include latitude and longitude coordinates, azimuth information, height information, configuration information, and so on, for the antennas at the cell site.

In operation 620, the parameter adjustment system 150 causes a map of a selected portion of the geographical area to be displayed by a user interface provided by the optimization tool 115. The presented map may include display elements representing the antennas at first positions within the displayed map that correspond to the known location coordinates for the antennas at the cell site.

In operation 630, the parameter adjustment system 150 receives input from a user that is associated with movement of the presented display elements to second positions within the displayed map that correspond to images of the antennas within the displayed map. For example, a user may perform drag and drop operations that cause the display elements to move from the positions within the map that correspond to the current locations for the one or more antennas located at the cell site to second, different, positions within the map that correspond to images of the one or more antennas within the map.

In operation 640, the parameter adjustment system 150 receives input from the user that identifies an estimated parallax error or other offset information associated with a display view of the displayed map. For example, the map offset module 250 may access input associated with a graphical element drawn on the map (via user interface 152) by a user between two points of an image of a structure displayed by the map, and identify a parallax error for the map based on the accessed input.

In operation 650, the parameter adjustment system 150 adjusts the known location coordinates for the antennas at the cell sites to new location coordinates associated with the second positions within the displayed map, optionally compensating for the estimated parallax error of the displayed map. In operation 660, the parameter adjustment system 150 transmits the new location coordinates to a database for the telecommunications network that stores information associated with cell sites within the telecommunications network, such as network database 130.

Thus, in some embodiments, the parameter adjustment system 150 enables users to accurately and quickly modify known parameters for telecommunications network device, such as cell sites and associated antennas. In addition to the parameters described herein, the parameter adjustment system 150 may identify and measure other parameters associated with cell sites, such as wall orientation of buildings (e.g., which is associated with an amount of antenna azimuth that can be adjusted without projecting an antenna signal into the wall of the building), how the antenna arms (structures where the antenna are bolted) on monopoles are oriented, in order to calculate how much azimuth change is acceptable for an antenna without directing the emitted antenna energy into part of the monopole power structure itself, whether there are other structures (other than the same wall that the antenna is mounted) which will block the signal from the antenna, these structures may be identified and marked on the map to know which antenna azimuths are acceptable, and so on.

Of course, the parameter adjustment system 150 may be utilized to adjust, correct, and/or verify parameters, such as location coordinates, for a variety of other devices or structures located within geographical locations capable of being images and/or mapped. Some examples include charging network stations, infrastructure components, power lines and other grid components, geological features, and so on.

For example, the parameter adjustment system 150 may be utilized to correct or confirm a survey, such as a survey performed in the past, of a target area. Using images of the target area (e.g., images of an area of ground or structures build within the area), the parameter adjustment system 150 can identify the location information of features or points of reference within the map. Such location information may then be used to confirm or correct previously stored information for the target area.

For example, the parameter adjustment system 150 may generate or update various different reports associated with the adjustment of parameters to cell sites using the tool described herein. Example reports include project data reports that include project specific information, site history reports that include information associated with a cell site or cell sites, audit reports for a network, area, or location, update reports that include information identifying assets (e.g., cell sites) that have been updated with new or modified parameters, and so on).

Thus, in some embodiments, the parameter adjustment system 150 may correct previously determined geographical location information for one or more devices or features located within an imaged geographical area. The parameter adjustment system 150 may, via or utilizing the parameter adjustment tool 115, display a map of the imaged geographical area, wherein the displayed map includes images that correspond to the one or more devices located within the imaged geographical area. The system 150 overlays the displayed map with graphical elements at first positions within the displayed map that are associated with the previously determined geographical location information.

Via a presented user interface, the system 150 receives input associated with moving the overlaid graphical elements from the first positions to second positions within the displayed map for the images that correspond to the one or more devices, and updates the geographical location information for the one or more devices located within the imaged geographical area to geographical location information associated with the second positions within the displayed map.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system, comprising:
    at least one hardware computer, wherein the hardware computer is configured to execute software instructions; and
    at least one non-transitory computer-readable medium, accessed by the at least one hardware computer and carrying the software instructions,
        wherein the software instructions, when executed perform operations comprising:
            causing a map of a selected portion of a geographical area to be displayed by a user interface,
                wherein the selected portion of the geographical area includes satellite imagery;

identifying, and causing to be displayed, an incorrect position within the selected portion of the geographical area,
wherein the incorrect position corresponds to current, erroneous location information stored for a previously installed cell site, or one or more antennas at the previously installed cell site;
presenting one or more display elements on the user interface representing the incorrect position of the previously installed cell site, or one or more antennas at the previously installed cell site, within the selected portion of the geographical area;
receiving input from the user interface associated with movement of the presented display elements from the incorrect position to a correct position within the selected portion of the geographical area,
wherein the correct position corresponds to an actual depicted location of the previously installed cell site, or one or more antennas at the previously installed cell site, as shown on the satellite imagery; and
adjusting, and storing, updated location information for the previously installed cell site or one or more previously installed antennas at the cell site associated with the correct position within the selected portion of the geographical area to thereby correct the erroneous location information stored for the previously installed cell site, or the one or more antennas at the previously installed cell site.

2. The system of claim 1, wherein the software instructions further comprise:
accessing input associated with a graphical element drawn on the map between two points of an image of a structure displayed by the map.

3. The system of claim 1, wherein the software instructions further comprise determining offset information by analyzing images within the displayed map to identify parallax error.

4. The system of claim 1, wherein the current location information includes latitude and longitude coordinates for the one or more antennas located at the cell site.

5. The system of claim 1, wherein the current location information include a single latitude and longitude coordinate for each of multiple antennas located at the cell site, and
wherein the updated location information includes multiple, different, latitude and longitude coordinates for every antenna located at the cell site, and wherein the multiple, different, latitude and longitude coordinates correspond to satellite images of every antenna shown for the specific cell site.

6. The system of claim 1, wherein the current location information for the cell site include latitude and longitude coordinates and azimuth information for the one or more antennas located at the cell site.

7. The system of claim 1, wherein the software instructions further comprises accessing a satellite image map of a telecommunications network from a remotely located mapping system via an application programming interface (API) provided by the mapping system.

8. The system of claim 1, wherein the software instructions further comprise accessing or receiving input associated with dragging displayed arrows from positions within the selected portion that correspond to current locations for the one or more antennas to different positions within the displayed portion, wherein the displayed arrows point in directions associated with azimuth information assigned to the one or more antennas.

9. The system of claim 1, wherein the software instructions further comprises automatically determining different, positions within the displayed portion that correspond to images of the one or more antennas based on an analysis of features depicted within the displayed portion.

10. A computer-executable method, the method comprising:
causing a map of a selected portion of a geographical area to be displayed by a user interface,
wherein the selected portion of the geographical area includes satellite imagery;
identifying, and causing to be displayed, an incorrect position within the selected portion of the geographical area,
wherein the incorrect position corresponds to current, erroneous location information stored for a previously installed cell site, or one or more previously installed antennas for the cell site;
presenting one or more display elements on the user interface representing the incorrect position of the previously installed cell site, or one or more previously installed antennas for the cell site, within the selected portion of the geographical area;
receiving input from the user interface associated with movement of the presented display elements from the incorrect position to a correct position within the selected portion of the geographical area,
wherein the correct position corresponds to an actual depicted location of the previously installed cell site, or one or more previously installed antennas for the cell site, as shown on the satellite imagery; and
adjusting, and storing, updated location information for the previously installed cell site or one or more previously installed antennas at the cell site associated with the correct position within the selected portion of the geographical area to thereby correct the erroneous location information stored for the previously installed cell site, or the one or more previously installed antennas at the cell site.

11. The method of claim 10, further comprising:
accessing input associated with a graphical element drawn on the map between two points of an image of a structure displayed by the map.

12. The method of claim 10, further comprising:
determining offset information by analyzing images within the displayed map to identify parallax error.

13. The method of claim 10, further comprising:
accessing a satellite image map of a telecommunications network from a remotely located mapping system via an application programming interface (API) provided by the mapping system.

14. The method of claim 10, further comprising:
accessing or receiving input associated with dragging displayed arrows from positions within the selected portion that correspond to current locations for the one or more antennas to different, positions within the displayed portion, wherein the displayed arrows point in directions associated with azimuth information assigned to the one or more antennas.

15. At least one non-transitory computer-readable medium carrying instructions, which when executed by at least one data processor, cause the least one data processor to perform operations, the operations comprising:

causing a map of a selected portion of a geographical area to be displayed by a user interface,
    wherein the selected portion of the geographical area includes satellite imagery;
  identifying, and causing to be displayed, an incorrect position within the selected portion of the geographical area,
    wherein the incorrect position corresponds to current, erroneous location information stored for a previously installed cell site, or one or more antennas at the previously installed cell site;
  presenting one or more display elements on the user interface representing the incorrect position of the previously installed cell site, or one or more antennas at the cell site, within the selected portion of the geographical area;
    receiving input from the user interface associated with movement of the presented display elements from the incorrect position to a correct position within the selected portion of the geographical area,
      wherein the correct position corresponds to an actual depicted location of the previously installed cell site, or one or more antennas at the previously installed cell site, as shown on the satellite imagery; and
  adjusting, and storing, updated location information for the specific previously installed cell site or one or more previously installed antennas at the cell site associated with the correct position within the selected portion of the geographical area to thereby correct the erroneous location information stored for the previously installed cell site, or the one or more antennas at the previously installed cell site.

16. The non-transitory computer-readable storage medium of claim 15, wherein the current location information includes latitude and longitude coordinates for the one or more antennas located at the cell site.

17. The non-transitory computer-readable storage medium of claim 15, wherein the current location information includes a single latitude and longitude coordinate for each of multiple antennas located at the cell site, and
  wherein the updated location information includes multiple, different, latitude and longitude coordinates for every antenna located at the cell site, and wherein the multiple, different, latitude and longitude coordinates correspond to satellite images of every antenna shown for the specific cell site.

18. The non-transitory computer-readable storage medium of claim 15, wherein the current location information for the cell site include latitude and longitude coordinates and azimuth information for the one or more antennas located at the cell site.

19. The non-transitory computer-readable storage medium of claim 15, further comprising automatically determining different positions within the displayed portion that correspond to images of the one or more antennas based on an analysis of features depicted within the displayed portion.

20. The non-transitory computer-readable storage medium of claim 15, further comprising:
  providing the updated location information coordinates to a database for a telecommunications network that stores information associated with cell sites within the telecommunications network.

* * * * *